Figure 4:

(No Model.) 3 Sheets—Sheet 1.
H. P. MILLER.
PORTABLE COMBINATION GAS HEATING, COOKING, AND VAPORIZING APPARATUS.
No. 388,432. Patented Aug. 28, 1888.
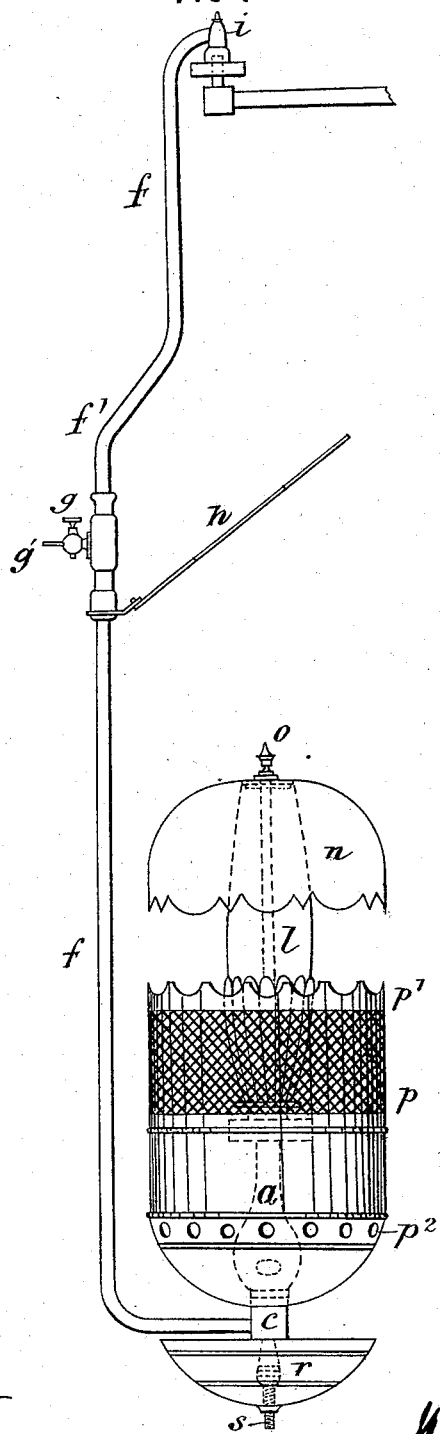
Witnesses
Inventor,

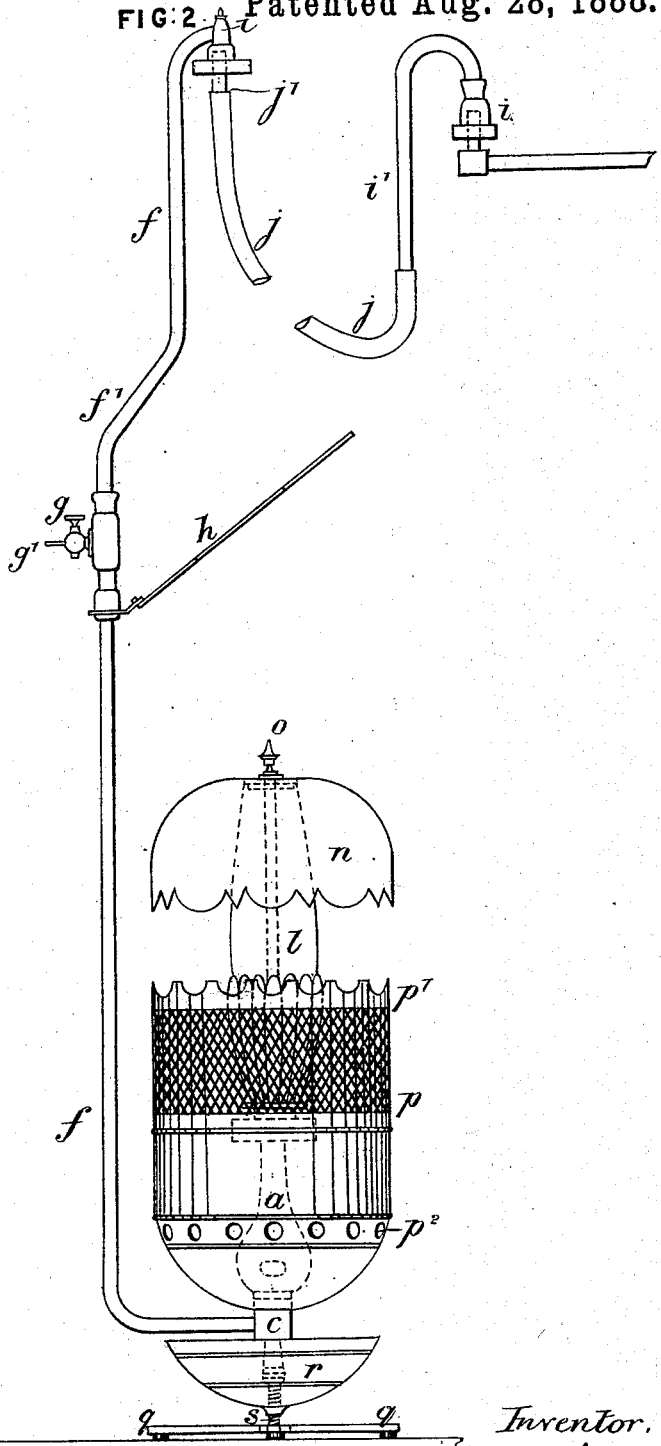

(No Model.) 3 Sheets—Sheet 3.
H. P. MILLER.
PORTABLE COMBINATION GAS HEATING, COOKING, AND VAPORIZING APPARATUS.
No. 388,432. Patented Aug. 28, 1888.

FIG. 3. FIG. 5. FIG. 6.
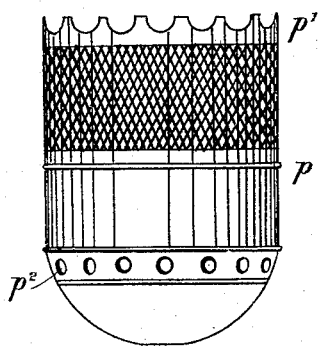 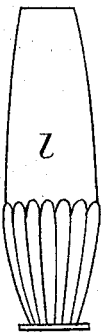 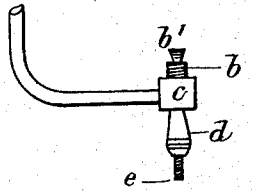
FIG. 7. FIG. 8.
FIG. 9.
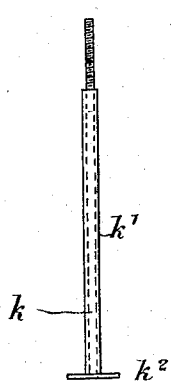  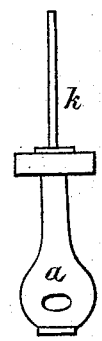
Witnesses. Inventor.

United States Patent Office.

HERBERT PERCY MILLER, OF LONDON, COUNTY OF MIDDLESEX, ENGLAND.

PORTABLE COMBINATION GAS HEATING, COOKING, AND VAPORIZING APPARATUS.

SPECIFICATION forming part of Letters Patent No. 388,432, dated August 28, 1888.

Application filed January 17, 1888. Serial No. 261,012. (No model.) Patented in England August 5, 1885, No. 9,354; in France June 8, 1887, No. 184,097, and in Belgium February 2, 1888, No. 80,490.

*To all whom it may concern:*

Be it known that I, HERBERT PERCY MILLER, a subject of the Queen of Great Britain, residing at 15 Craven Terrace, Hyde Park, London, in the county of Middlesex, England, engineer, have invented a new and useful Improved Portable Combination Gas Heating, Cooking, and Vaporizing Apparatus, (for which I have obtained a patent in Great Britain, No. 9,354, bearing date August 5, 1885; also a patent in France, No. 184,097, bearing date June 8, 1887; also a patent in Belgium, No. 80.490, bearing date February 2, 1888; and I have also made application in Canada for the grant of Letters Patent therefor, which application is still pending,) of which said invention the following is a specification.

The object of my improvements is to supply a simple, cheap, and highly effective combination apparatus whereby a room may be readily warmed or any light food quickly cooked, while a healthy degree of moisture is imparted to the surrounding atmosphere. This I effect by the apparatus illustrated in the accompanying drawings, wherein—

Figure 1 shows my improved apparatus suspended from an ordinary gas-burner, and Fig. 2 shows such apparatus mounted on a stand placed on a table, while Figs. 4, 5, 6, 7, 8, 9, respectively, show detail views of various parts of the apparatus, and are hereinafter more particularly referred to.

Similar letters of reference indicate corresponding parts throughout the several views.

Such apparatus consists of an atmospheric burner, $a$, screwed onto a threaded collar, $b$, furnished with a nipple, $b'$, fixed in a plain collar, $c$, provided with a tail-piece, $d$, terminating in a short screw-spindle, $e$. A supply-pipe $f$, having a bend, $f'$, is screwed into the collar $c$. Just below such bend a small tap, $g$, and jet $g'$, and a screen-plate, $h$, are fitted. The top of the supply-pipe is screw-threaded and fitted with a suitable nozzle, $i$, as shown in Fig. 1; or such nozzle may be fitted to a length of elastic tubing, $j$, provided with a metal union, $j'$, which screws onto the supply-pipe $f$, as shown in Fig. 2. The atmospheric burner $a$ is furnished with a vertical spindle, $k$, over which a socket-rod, $k'$, furnished with a small base plate, $k^2$, is fitted telescopically. This socket-tube serves to carry a terra-cotta tube, $l$, that fits loosely over the same. The terra-cotta tube is tapering in shape at the top, while at the bottom it expands into a fluted enlargement somewhat resembling an inverted cone, and terminates at its base in a collar, which forms a suitable seating. When such terra-cotta tube is mounted on the socket-rod, it is held in position by a cap-plate, $m$, having on its under side a rim, $m'$, which fits into the mouth of the terra-cotta tube. This cap-plate forms a seating for a terra-cotta dome, $n$, which is placed over the top of the socket-rod $k'$, and secured thereon by a screw-nut, $o$. The atmospheric burner and terra-cotta tube are surrounded by a wire cage, $p$, which is fitted over the threaded collar $b$, and is securely held in its place by the atmospheric burner when the latter is screwed into position. Such cage is provided round the top with a crown or rim, $p'$, so that by simply unscrewing the nut $o$ and taking off the terra-cotta dome a small kettle or other similar vessel containing water, milk, or other light food can be placed on such crown or rim and such water or other liquid can be heated or boiled, while by turning on the tap $g$ and igniting the jet $g'$ a sufficient light can be obtained, thus dispensing with any necessity for a candle or lamp to prepare such food. The screen-plate $h$ prevents the heat as it ascends from injuring either the gas-fitting or the nozzle when connected therewith.

In order to prevent the atmosphere becoming too dry, I attach to the screw-spindle $e$ a metal cup, $r$, hereinafter termed the "vaporizer." I then fill such vaporizer with water, which, as it becomes warm, is given off in the form of vapor in the surrounding atmosphere, and so preserves a healthy degree of moisture therein. The vaporizer $r$ is furnished at the bottom with a screw-pin, $s$, so that when it is desired to place the apparatus on a table or elsewhere, as shown in Fig. 2, (instead of suspending it from a gas-burner, as shown in Fig. 1,) I screw a tripod base, $q$, to such screw-pin $s$, whereby a suitable stand for the apparatus is at once provided.

If desired, the vaporizer may be dispensed with and the tripod base may be screwed onto the spindle *e* direct.

One great advantage of my apparatus is that the surrounding atmosphere is quickly heated without being charged with any poisonous or offensive fumes, and it is therefore particularly adapted for use for invalids and children and persons of delicate susceptibility. This unique advantage is owing to the fact that the gas-flame is thrown vertically onto the terra-cotta tube, while the waste products of combustion ascend into the terra-cotta dome, which forms a combustion-chamber, and are there consumed instead of vitiating the surrounding atmosphere.

It is obvious that my apparatus combines in a high degree the essential advantages of safety, simplicity, utility, portability, cleanliness, and economy. It can be put into immediate operation by attaching the nozzle to any gas-burner and left with perfect safety for several hours together, as it requires no further attention when used for heating purposes only.

Fig. 3 shows a detail view of the cage *q*, with crown or rim *p'* and perforations $p^2$ in bottom for the supply of air to the atmospheric burner *a*. Fig. 4 shows a detail view of the cap-plate *m* with rim *m'*. Fig. 5 shows a detail view of the terra cotta tube *l*. Fig. 6 shows a detail view of the threaded collar *b*, nipple *b'*, plain collar *c*, tail-piece *d*, and screw-spindle *e*. Fig. 7 shows a detail view of the socket-rod *k'*, with base-plate $k^2$, the spindle *k* of atmospheric burner which fits therein being indicated in dotted lines. Fig. 8 shows a detail view of the atmospheric burner *a* with vertical spindle *k*. Fig. 9 shows a detail view, in plan, of the top of the atmospheric burner *a*.

In Fig. 2 the nozzle *i* is shown furnished with a metal tubular extension, *i'*, in order to allow of its being connected to the elastic tube *j*.

Having fully described my invention, what I claim, and desire to secure by Letters Patent of the United States of America, is—

An improved portable combination gas heating, cooking, and vaporizing apparatus, consisting of atmospheric burner *a*, with spindle *k*, threaded collar *b*, nipple *b'*, plain collar *c*, tail-piece *d*, screw-spindle *e*, supply-pipe *f*, tap *g*, jet *g'*, screen-plate *h*, nozzle *i*, socket-rod *k'*, with base plate $k^2$, terra-cotta tube *l*, cap-plate *m*, dome *n*, nut *o*, cage *p*, with crown or rim *p'*, tripod base *q*, and vaporizer *r*, with screw-pin *s*, all respectively constructed, combined, arranged, and fitted substantially in the manner and for the purposes hereinbefore described and shown.

HERBERT PERCY MILLER.

Witnesses:
SHIRLEY BOWDEN,
PERCY K. WOODWARD.